March 25, 1958 T. A. SEEGRIST 2,827,930
LIQUID FUEL-TANK FILLING DEVICE
Filed Jan. 28, 1954
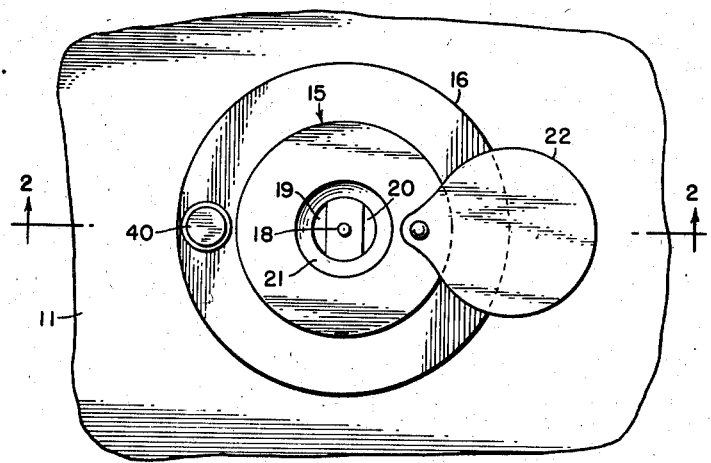
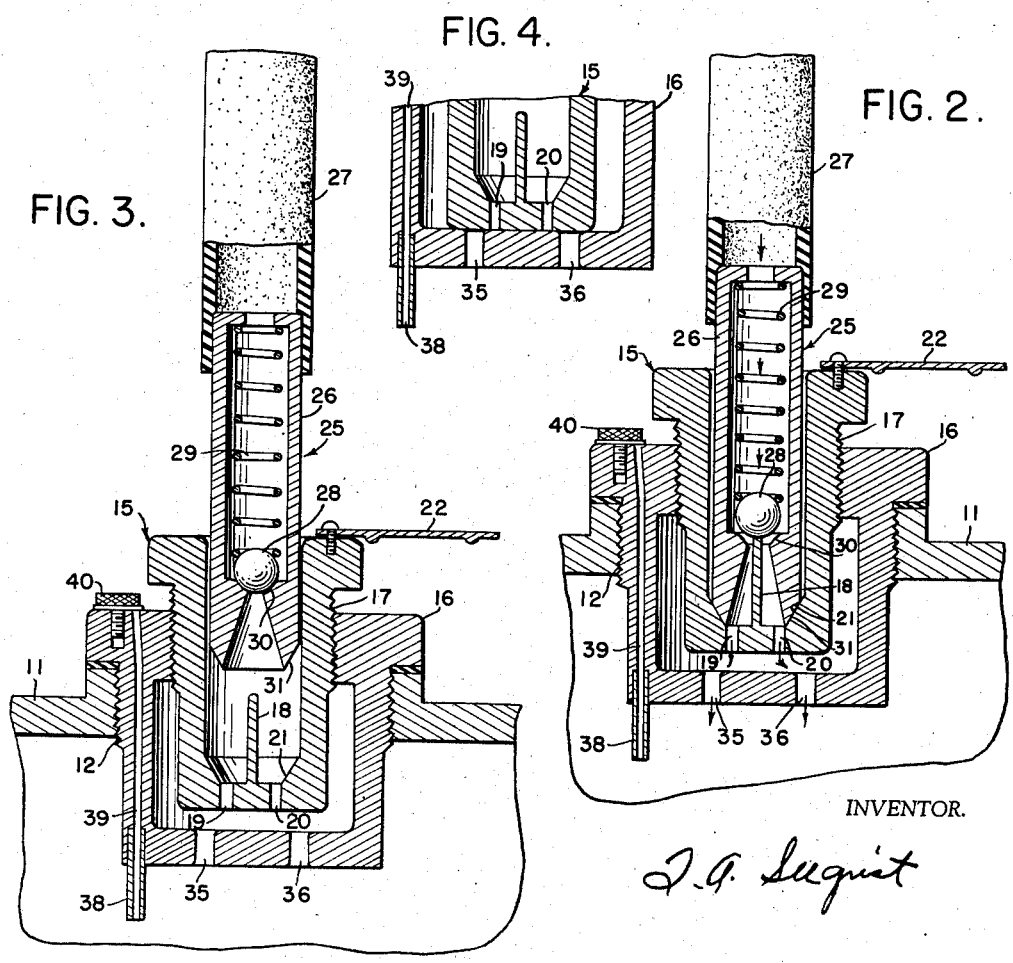
INVENTOR.
J. A. Seegrist

United States Patent Office 2,827,930
Patented Mar. 25, 1958

2,827,930

LIQUID FUEL-TANK FILLING DEVICE

Theodore A. Seegrist, McLean, Va.

Application January 28, 1954, Serial No. 406,908

8 Claims. (Cl. 141—292)

(Granted under Title 35, U. S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

This invention relates to a device for filling a fuel-tank with an inflammable liquid fuel which is simple in structure and which renders filling of the tank convenient and safe. The device is particularly designed for use with outboard motors, which are hazardous, both because of dangers to the operator while filling the fuel-tank due to capsizing the boat or falling overboard and because of fire danger due to spilling of gasoline.

With the filling device of the present invention, the operator can fill the fuel-tank without removal of supply or fuel-tank caps by simply manually coupling two valve elements. This can be accomplished with the motor running.

In general, according to the invention, the device comprises two elements, a fuel-tank valve element and a hose valve element. The full-tank valve element is adapted to be fixedly attached to a portion of the wall of a fuel-tank, thus functioning as a part of the wall, and the hose valve element to one end of a flexible hose which leads to a supply tank. The supply tank may be any conventional structure designed to supply fuel to the hose under slight pressure, such as a gravity feed tank, air pressure tank, or a tank equipped with a pump. The hose valve element has a tube with one end attached to the flexible hose leaving the other end free. A spring-pressed movable valve gate normally held closed, as for example a ball pressed onto a ball seat, is located inside the tube remote from the free end thereof. This protects the gate against accidental opening. The fuel-tank valve element has a finger which enters the free open end of the tube to open the gate when the valve elements are coupled and also has a port for passage of the fuel into the fuel-tank. The fuel-tank valve element is provided with a seat and the hose valve element is provided with a face, which seat and face mate when the elements are coupled, thus to prevent passage of the fuel except past the gate and through the port into the fuel-tank.

Preferably, the fuel-tank valve element is cup-shaped, the finger being carried inside the cup at its bottom and projecting toward the top, so that the free end of the hose valve element is inserted into the cup-shaped valve element when coupling the elements. Also the seat on the fuel-tank valve element is preferably on the bottom of the cup and surrounds the finger and port, and the face on the hose valve element is on the free end of the tube.

Other features of the invention are fully described below.

For a detailed description of the invention, reference is made to the accompanying drawing in which Figure 1 is a top plan view showing the fuel-tank valve element on a portion of the fuel-tank wall; and Figure 2 is a section on the line 2—2 of Figure 1, but showing in addition the hose valve element in section coupled with the fuel-tank valve element in operative relationship for filling the tank.

Figure 3 is a section similar to Figure 2 but showing the elements in the inoperative relationship for filling the tank; and Figure 4 is a section of a fragment similar to Figure 3 but showing the tank closed.

In the drawing, 11 represents the top wall of a conventional outboard motor gasoline fuel-tank provided with a screw-threaded filling aperture 12 which in usual practice is closed with a screw-threaded cap (not shown). It is preferred for constructional reasons to mount the fuel-tank valve element 15 of the present invention in a screw-thread plug 16, designed to take the place of the usual cap. However, in filling the fuel-tank the plug 16 is not removed, and thus functions merely as a portion of the wall of the fuel-tank.

Element 15 is cup-shaped and provided with means for movably attaching it to the fuel-tank wall portion such as threads 17 for adjustably attaching it to plug 16. Finger 18 is integrally attached to the bottom of the cup inside thereof, and projects toward the top. Parts 19 and 20 are located in the bottom near the finger and a seat 21 on the element surrounds the finger and port. A movable cover 22 is provided on the cup-shaped valve element which may be swung into position to cover the cup when the filling device is not in use.

Hose valve element 25 has a tube 26 with one end attached to the flexible hose 27 leading to a supply tank (not shown). Valve gate or ball 28 inside the tube is pressed by spring 29 onto ball seat 30, thus normally to hold the gate closed. Face 31 on the free end of tube 26 mates with seat 21 when the valve elements are coupled as shown in Figure 2.

The plug 16 is also cup-shaped with element 15 screwing into it and is provided with openings 35 and 36 through which the fuel flows in passing from ports 19 and 20 to the fuel-tank. The bottom of element 15 provides a dam which closes openings 35 and 36 when element 15 is screwed downwardly into one position i. e., its normal position, as shown in Figure 4 when the tank is not being filled, the position for filling the fuel-tank being as shown in Figure 2.

Air is vented into and out of the fuel-tank through pipe 38 and air duct 39. Screw 40 when screwed down seats on the exit of duct 39, thus to close the vent. Pipe 38 projects lower into the tank than openings 35 and 36.

When the fuel-tank has been filled the hose valve element is withdrawn, element 15 is screwed down, thus causing its bottom to close openings 35 and 36 to prevent outflow of gasoline, and cover 22 is swung into closed position. Screw 40 may be turned to close air duct 39 when the motor is not in operation, but the duct is opened to permit entrance of air to replace used gasoline during motor operation, as in usual operation.

To fill the fuel-tank, it is merely necessary to unscrew element 15 a few turns, thus to uncover openings 35 and 36, and to manually insert the free end of tube 26 into the cup-shaped element 15 until finger 18 lifts the gate 28 from its seat 30 and seat 21 mates with face 31. Gasoline will then flow from the supply tank past the gate, through ports 19 and 20 and openings 35 and 36 into the fuel-tank with no possible point of escape. Due to the fact that pipe 38 projects lower into the fuel-tank than openings 35 and 36, when the gasoline level reaches the lower end of the pipe a small amount of liquid gasoline will soon escape from vent 39. (It is necessary for the air vent to be open during filling of the tank.) This warns the operator that the fuel-tank is essentially filled and he can immediately remove the tube 26 from the element 15, spring 29 automatically closing the gate 28. Any small amount of gasoline collected in element 15 or plug 16 will then soon drain into the fuel-tank and element 15 can be screwed down into position to close the openings 35 and 36 thus to close the tank.

I claim:

1. A device for filling a fuel-tank with an inflammable liquid fuel comprising a cup-shaped fuel-tank valve element for attachment to a portion of the wall of the fuel-tank and a hose valve element for attachment to a flexible hose leading to a liquid fuel supply tank, said hose valve element having a tube with one end adapted to be attached to the flexible hose leaving the other end free and having a spring pressed movable gate inside the tube and a seat for said gate remote from the free end of the tube, the gate being normally held closed to prevent flow of fuel therethrough, said hose valve element being adapted to be hand coupled to the fuel-tank valve element for filling the fuel-tank by inserting the free end of the hose valve element into the cup-shaped fuel-tank valve element, said fuel-tank valve element having a finger inside the cup at the bottom thereof projecting towards the top of the cup for entrance into the free end of the tube to open the gate when the valve elements are coupled and having a port for passage of fuel into the fuel-tank, said fuel-tank valve element being provided with a seat and said hose valve element being provided with a face, which seat and face mate when the valve elements are coupled to prevent passage of fuel except past the gate and through the port into the fuel-tank, said fuel-tank valve element having screw threads for attaching it to the portion of the wall of the fuel-tank, an opening in the portion of the wall of the fuel-tank through which the fuel must flow in passage from the port to the fuel-tank, the fuel-tank valve element having a dam which upon screwing of the fuel-tank valve element into one position closes the opening to prevent outflow of fuel from the fuel-tank when the valve elements are uncoupled, and which upon unscrewing of the fuel-tank valve element into another position opens the opening for filling of the fuel-tank.

2. The device according to claim 1 in which a pipe is provided for venting air out of the fuel-tank during its filling, the pipe projecting lower into the tank than the opening in the portion of the wall of the fuel-tank, whereby as the fuel level reaches the lower end of the pipe a small amount will escape through the vent to warn the operator that the fuel-tank is essentially filled.

3. A device for filling a fuel-tank with an inflammable liquid fuel comprising a fuel-tank valve element for attachment to a portion of the wall of the fuel-tank and a hose valve element for attachment to a flexible hose leading to a liquid fuel supply tank, said hose valve element being adapted to be hand coupled to the fuel-tank valve element for filling the fuel-tank, said fuel-tank valve element being provided with a seat and said hose valve element being provided with a face, which seat and face mate when the valve elements are coupled to prevent passage of fuel except into the fuel-tank, said fuel-tank valve element having screw threads for attaching it to the portion of the wall of the fuel-tank, an opening in the portion of the wall of the fuel-tank through which the fuel must flow in passage to the fuel-tank, the fuel-tank valve element having a dam which upon screwing of the fuel-tank valve element into one position closes the opening to prevent outflow of fuel from the fuel-tank when the valve elements are uncoupled, and which upon unscrewing of the fuel-tank valve element into another position opens the opening for filling of the fuel-tank.

4. A device for filling a fuel-tank with an inflammable liquid fuel comprising a fuel-tank valve element for attachment to a portion of the wall of the fuel-tank and a hose valve element for attachment to a flexible hose leading to a liquid fuel supply tank, said hose valve element being adapted to be hand coupled to the fuel-tank valve element for filling the fuel-tank, said fuel-tank valve element being provided with a seat and said hose valve element being provided with a face, which seat and face mate when the valve elements are coupled to prevent passage of fuel except into the fuel-tank, said fuel-tank valve element having means for movably attaching it to the portion of the wall of the fuel-tank, an opening in the portion of the wall of the fuel-tank through which the fuel must flow in passage to the fuel-tank, the fuel-tank valve element having a dam which upon movement of the fuel-tank valve element into one position closes the opening to prevent outflow of fuel from the fuel-tank when the valve elements are uncoupled, and which upon movement of the fuel-tank valve element into another position opens the opening for filling of the fuel-tank.

5. The device according to claim 4 in which a pipe is provided for venting air out of the fuel-tank during its filling, the pipe projecting lower into the tank than the opening in the portion of the wall of the fuel-tank, whereby as the fuel level reaches the lower end of the pipe a small amount will escape through the vent to warn the operator that the fuel-tank is essentially filled.

6. A device for filling a fuel-tank with an inflammable liquid fuel comprising a fuel-tank valve element for attachment to a portion of the wall of a fuel-tank and a hose valve element for attachment to a flexible hose leading to a liquid fuel supply tank, said hose valve element being adapted to be hand coupled to the fuel-tank valve element for filling the fuel-tank, said fuel-tank valve element being provided with a seat and said hose valve element being provided with a face which seat and face mate when the valve elements are coupled to prevent passage of fuel except into the fuel-tank, an opening in the portion of the wall of the fuel-tank through which the fuel must flow in passage to the fuel-tank, a pipe for venting air out of the fuel-tank during its filling, the pipe projecting lower into the tank than the opening in the portion of the wall of the fuel tank, whereby as the fuel level reaches the lower end of the pipe a small amount will escape through the vent to warn the operator that the fuel-tank is essentially filled.

7. A device for filling a fuel-tank with an inflammable liquid fuel comprising a screw plug designed to take the place of the usual cap used for closing the filling aperture of the fuel-tank of an outboard motor and having a cup-shaped fuel-tank valve element, and a hose valve element for attachment to a flexible hose leading to a liquid fuel supply tank, said hose valve element having a tube with one end adapted to be attached to the flexible hose leaving the other end free and having a spring pressed movable gate inside the tube and a seat for said gate remote from the free end of the tube, the gate being normally held closed to prevent flow of fuel therethrough, said hose valve element being adapted to be hand coupled to the fuel-tank valve element for filling the fuel-tank by inserting the free end of the hose valve element into the cup-shaped fuel-tank valve element, said fuel-tank valve element having a finger inside the cup at the bottom thereof projecting towards the top of the cup for entrance into the free end of the tube to open the gate when the valve elements are coupled and having a port for passage of fuel into the fuel-tank, said fuel-tank valve element being provided with a seat and said hose valve element being provided with a face which seat and face mate when the valve elements are coupled to prevent passage of fuel except past the gate and through the port into the fuel-tank.

8. A device for filling a fuel-tank with an inflammable liquid fuel comprising a screw plug designed to take the place of the usual cap used for closing the filling aperture of the fuel-tank of an outboard motor and having a cup-shaped fuel-tank valve element, a hose valve element for attachment to a flexible hose leading to a liquid fuel supply tank, said hose valve element having a tube with one end adapted to be attached to the flexible hose leaving the other end free and having a spring pressed movable gate inside the tube and a seat for said gate remote from the free end of the tube, the gate being normally held closed to prevent flow of fuel therethrough, said hose valve element being adapted to be hand coupled to the fuel-tank valve element for filling the fuel-tank by inserting the free end of the hose valve element into the cup-shaped fuel-tank valve element, said fuel-tank valve element having a finger inside the cup at the bottom thereof projecting towards the top of the cup for entrance into the free end of the tube to open the gate when the valve elements are coupled and having a port for passage of fuel into the fuel-tank, said fuel-tank valve element being provided with a seat and said hose valve element being provided with a face which seat and face mate when the valve elements are coupled to prevent passage of fuel except past the gate and through the port into the fuel-tank, and a pipe for venting air out of the fuel-tank during its filling whereby as the fuel level reaches the lower end of the pipe a small amount will escape through the vent to warn the operator that the fuel-tank is essentially filled.

References Cited in the file of this patent
UNITED STATES PATENTS

| | | |
|---|---|---|
| 193,676 | Sperry | July 31, 1877 |
| 1,137,551 | Taby | Apr. 27, 1915 |
| 2,527,849 | Ranney | Oct. 31, 1950 |
| 2,548,957 | Di Rosa | Apr. 17, 1951 |
| 2,638,916 | Scheiwer | May 19, 1953 |

UNITED STATES PATENT OFFICE
CERTIFICATE OF CORRECTION

Patent No. 2,827,930 — March 25, 1958

Theodore A. Seegrist

It is hereby certified that error appears in the printed specification of the above numbered patent requiring correction and that the said Letters Patent should read as corrected below.

Column 2, line 25, for "Parts" read -- Ports --; line 27, for "port" read -- ports --.

Signed and sealed this 2nd day of June 1959.

(SEAL)
Attest:

KARL H. AXLINE
Attesting Officer

ROBERT C. WATSON
Commissioner of Patents